United States Patent [19]
Harris

[11] Patent Number: 5,110,207
[45] Date of Patent: May 5, 1992

[54] OPTICAL SYSTEM INCLUDING INTERFEROMETER FOR ENHANCING THE PERFORMANCE OF A PHOTOCONDUCTIVE NON-SHOT NOISE LIMITED DETECTOR

[75] Inventor: Clarke E. Harris, Wayland, Mass.

[73] Assignee: Raytheon Company, Lexington, Mass.

[21] Appl. No.: 698,254

[22] Filed: May 6, 1991

Related U.S. Application Data

[63] Continuation of Ser. No. 388,733, Jul. 31, 1989, abandoned, which is a continuation of Ser. No. 033,1958, Apr. 3, 1987, abandoned.

[51] Int. Cl.⁵ .................................................. G01C 3/08
[52] U.S. Cl. .......................................... 356/4.5; 356/5; 356/28.5; 356/345; 356/349
[58] Field of Search ................... 356/4.5, 5, 28.5, 349, 356/351, 363, 345

[56] References Cited

U.S. PATENT DOCUMENTS

| | | | |
|---|---|---|---|
| 3,426,207 | 2/1969 | Fried et al. | 250/199 |
| 4,042,822 | 8/1977 | Brandewie et al. | 250/216 |
| 4,305,666 | 12/1981 | Becherer et al. | 356/349 |
| 4,662,741 | 5/1987 | Duvall et al. | 356/5 |

OTHER PUBLICATIONS

"Performance Study of Acousto-Optic Frequency Shifter in CO₂ Laser Velocimeter", Pomeroy et al., J. Phys. E: Sci. Instrum., Sep. 1980, pp. 982–985.
Proceedings of the IEEE, vol. 51, No. 12, Dec. 1963, p. 1787, New York; W. S. Reed et al: "Optical Heterodyning with Noncritical Angular Alignment".
Proceedings of the IEEE, vol. 58, No. 6, Jun. 1970, pp. 943–944, New York; W. T. Mayo, Jr.: "Antenna Pattern Synthesis with an Imaging Optical Heterodyne Receiver".
Proceedings of the IEEE, vol. 54, No. 10, Oct. 1966, pp. 1350–1356, New York; A. E. Siegman; "The Antenna Properties of Optical Heterodyne Receivers".

*Primary Examiner*—Samuel Turner
*Attorney, Agent, or Firm*—Christopher L. Maginniss; Richard M. Sharkansky

[57] ABSTRACT

An interferometer for transmitting a beam of electromagnetic energy toward a target, portions of the transmitted beam reflected by the target being directed onto a detecting surface of a detector element with a local oscillator beam to provide a beat frequency signal representative of, for example, target range. The interferometer comprises a first lens for focusing the target-reflected return beam onto substantially a point on a detecting surface. The interferometer additionally comprises a second lens, for example, for focusing the local oscillator beam through a focal point onto the first lens. The first and second lenses are disposed to align such focal point of the second lens with a focal point of the first lens to thereby direct the local oscillator beam onto the detecting surface of the detector element with a substantially uniform intensity distribution thereon. With such arrangement, the detector element may be implemented as a photoconductive, rather than a photovoltaic, detector with only a minimal net increase in the noise equivalent power (NEP) thereof, such as 5 dB, resulting in similar slight reduction in the signal-to-noise ratio of the interferometer. Since such photoconductive detector element may be cooled by thermoelectric stacks, the requirement for liquid nitrogen coolant is eliminated, thereby significantly reducing the size and weight of the interferometer system.

31 Claims, 5 Drawing Sheets

OPTICAL SYSTEM INCLUDING INTERFEROMETER FOR ENHANCING THE PERFORMANCE OF A PHOTOCONDUCTIVE NON-SHOT NOISE LIMITED DETECTOR

This application is a continuation of application Ser. No. 388,733 filed July 31, 1989, and now abandoned which is a continuation of Ser. No. 033,958, filed Apr. 3, 1987, and now abandoned.

BACKGROUND OF THE INVENTION

The present invention relates generally to interferometers for laser radar systems and more particularly to interferometers for use with thermoelectrically cooled photoconductive detectors.

As is known in the art, interferometers are used in laser radar systems for determining the beat frequency between transmitted laser signals and target-reflected return signals to thereby determine such target parameters as range and Doppler speed. Such interferometers are used in both homodyne laser radar systems and heterodyne laser radar systems. In a typical interferometer, a laser produces a linearly polarized (such as p-polarized) single (such as $TEM_{00}$) mode beam of electromagnetic energy which is directed through a polarization discriminator, such as a Brewster plate, which couples the p-polarized beam to a quarter-waveplate. The quarter-waveplate transforms the polarization of the beam to circular (such as right-circular) polarization. The circularly polarized laser beam is transmitted toward a target, a portion of the transmitted beam being reflected by the target and returned to the interferometer as an oppositely-circularly (such as left-circularly) polarized beam. The quarter-waveplate transforms the polarization of the return beam to linear polarization orthogonal to the linear polarization of the beam produced by the laser (e.g., to an s-polarized beam). The s-polarized beam is focused by a lens, typically a positive meniscus lens, onto substantially a point on a detecting surface of a detector element. In a homodyne interferometer, a portion of the p-polarized beam produced by the laser is deflected and the polarization thereof rotated (such as by a half-waveplate) to a polarization identical to the s-polarized target reflected return beam focused onto the detector, thereby providing an s-polarized local oscillator (L.O.) beam. A separate laser generates the s-polarized L.O. beam in a heterodyne interferometer. The local oscillator beam conventionally is focused by the meniscus lens onto the same point on the detecting surface of the detector element as the target-reflected return beam. That is, substantially a point on the detecting surface is illuminated by superimposed target-reflected return and L.O. beams. The superimposed target-reflected return and L.O. beams are of identical linear polarization and have the same plane wavefronts. The local oscillator beam also has a Gaussian intensity distribution on the detector element, which is derived from the single mode $TEM_{00}$ output of the laser. The superimposed signals interfere on the detector element, with the detector element thereby producing a beat frequency signal having a frequency representative of the range of the target, which may be further processed to determine target Doppler speed.

Typically, interferometers for laser radar systems have utilized photovoltaic detectors cooled to approximately 77° K with liquid nitrogen in order to obtain maximum sensitivity to the incident L.O. beam and target-reflected return beam and to provide the photovoltaic detector with minimum noise equivalent power (NEP). However, photoconductive detectors have recently been developed which need be cooled to only about 190° K, and thus may be cooled by thermoelectric stacks, thereby eliminating the requirement for providing liquid nitrogen to cool the detector element. While conventional interferometers (such as the interferometer discussed above), which focus both the L.O. beam and the target-reflected return beam to substantially a point on the detecting surface of a photoconductive detector, are satisfactory in some applications, such thermoelectrically-cooled photoconductive detector has an NEP approximately 10 dB higher than that provided by a photovoltaic detector in such an interferometer. Thus, the signal-to-noise ratio of a conventional interferometer is decreased by approximately 10 dB when a photoconductive detector is substituted for a photovoltaic detector. Such a large increase in NEP and decrease in signal-to-noise ratio is difficult to compensate for and may not be acceptable in some applications.

SUMMARY OF THE INVENTION

In accordance with the present invention, an interferometer is provided comprising: means for transmitting a beam of electromagnetic energy toward a target; means for directing portions of the transmitted beam reflected by the target onto a surface of a detector element; and means for providing a local oscillator beam of electromagnetic energy, the local oscillator beam providing means and the directing means comprising means for coupling the local oscillator beam to the detector element with a substantially uniform intensity distribution on the surface thereof. With such arrangement, the detector element may be implemented as a photoconductive, rather than a photovoltaic, detector with only a minimal net increase in the noise equivalent power (NEP) of the detector element, such as 5 dB, resulting in similar slight reduction in the signal-to-noise ratio of the interferometer. Since such photoconductive detector element may be cooled by thermoelectric stacks, the requirement for liquid nitrogen coolant is eliminated, thereby significantly reducing the size and weight of the interferometer system. The minimal decrease in signal-to-noise ratio may be offset by increasing laser power, which still would provide an interferometer of less size, weight and electrical power consumption than a conventional interferometer utilizing a liquid nitrogen-cooled photovoltaic detector element.

In a preferred embodiment of the invention, a first portion of a transmitted beam is transmitted toward a target. Portions of such transmitted beam reflected by the target are received by the interferometer and coupled to a first lens. The first lens focuses such target-reflected return beam onto substantially a point on a surface of the detector element. A local oscillator (L.O.) beam is produced from a second portion of the beam produced by the laser. A second lens focuses the local oscillator beam through a focal point onto the first lens as a diverging beam. The first and second lenses are disposed to position such focal point of the second lens at substantially a focal point of the first lens to thereby direct the local oscillator beam onto the surface of the detector element with a substantially uniform intensity distribution over such surface.

In a second embodiment of the invention, the local oscillator beam is produced by a beam splitter which reflects the local oscillator beam toward the detector element. The beam splitter comprises a slightly curved (such as concave) reflecting surface to focus the local oscillator beam through a focal point and onto the lens as a diverging beam. The lens collimates the L.O. beam and directs such L.O. beam onto the surface of the detector element with substantially uniform intensity distribution on the detector element surface, while also focusing target-reflected portions of the transmitted beam onto substantially a point on the surface of the detector element.

In a third embodiment of the invention, a heterodyne interferometer is provided utilizing a separate local oscillator laser. A first lens focuses the target-reflected return beam to substantially a point on a detecting surface of a detector element, and a second lens acts in combination with the first lens to direct the local oscillator beam onto the detecting surface of the detector element with substantially uniform intensity distribution thereon.

BRIEF DESCRIPTION OF THE DRAWINGS

The foregoing features of the present invention and the advantages thereof may be fully understood from the following detailed description read in conjunction with the accompanying drawings wherein.

DESCRIPTION OF THE PREFERRED EMBODIMENTS

Figure 1A:
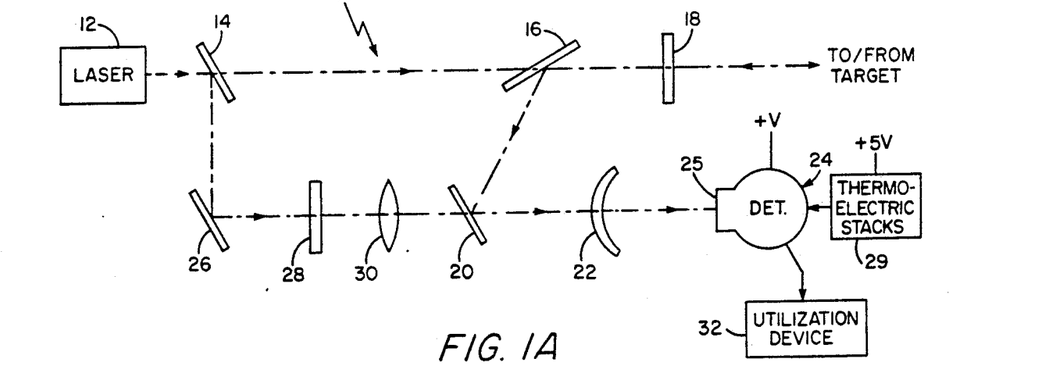
FIG. 1A is a block diagram of an interferometer according to a first embodiment of the present invention.

Referring now to FIG. 1A, shown is an interferometer 10 according to a first embodiment of the present invention having the output of a laser 12 coupled thereto, interferometer 10 comprising beam splitter 14, Brewster plate 16 and quarter-waveplate 18 for transmitting a beam of electromagnetic energy produced by laser 12 toward a target (not shown). Interferometer 10 also comprises beam combiner 20 and lens 22 for directing portions of the transmitted beam reflected by the target (and by Brewster plate 16) onto a detecting surface 25 of detector element 24, here cooled by thermoelectric stacks 29. Also provided are mirror 26, half-waveplate 28 and lens 30 arranged as shown for providing a local oscillator (L.O.) beam of electromagnetic energy for detector element 24 via combiner 20 and lens 22 in a manner discussed in detail hereinafter. Suffice it here to say that lens 30 and lens 22 couple the local oscillator beam onto detector element 24 with substantially uniform intensity distribution on detecting surface 25 thereof. With such arrangement, detector element 24 may be implemented as a photoconductive, rather than a photovoltaic, detector with only a slight, such as 5 dB, increase in detector noise equivalent power (NEP), thereby resulting in a similar minimal increase in the signal-to-noise ratio of interferometer 10. Since such a photoconductive detector element is cooled by thermoelectric stacks 29, the requirement for liquid nitrogen coolant is eliminated, thereby significantly reducing the size and weight of interferometer 10. The minimal signal-to-noise ratio decrease may be offset by, for example, increasing the output power of laser 10 (such as by 5 times to recover the aforementioned 5 dB). Alternately, the signal-to-noise ratio may be increased by adjusting other system parameters, such as transmit beam aperture, as is known.

Figure 1B:
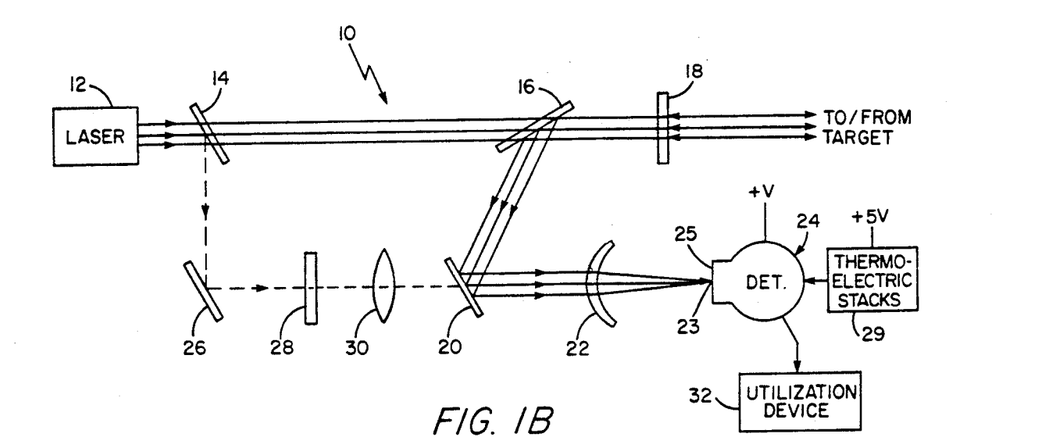
FIG. 1B is a block diagram of the interferometer of FIG. 1A depicting the paths of the transmitted beam thereof and a target-reflected return beam.

More specifically and referring to FIG. 1B, laser 12, here a $CO_2$ laser, produces a linearly polarized (here, p-polarized) single mode (here, the $TEM_{00}$ mode) beam of electromagnetic energy having a wavelength of about 10.6 $\mu$m and, here, a power level of approximately 5 watts. A first portion of such beam is coupled through beam splitter 14 and directed to polarization discriminator 16. Here, polarization discriminator 16 is a Brewster plate which couples substantially the entire p-polarized beam therethrough to quarter-waveplate 18. Quarter-waveplate 18 converts the p-polarized beam incident thereon from Brewster plate 16 to a circularly polarized beam, here having rightcircular polarization, and transmits such beam toward a target (not shown). A portion of the transmitted beam is reflected by the target and is incident on quarter-waveplate 18 as an oppositely-circularly polarized beam (here, left-circularly polarized) with respect to the beam transmitted to the target. Quarter-waveplate 18 converts such polarization to linear polarization orthogonal to the linear polarization produced by laser 12 (that is, s-polarization). Brewster plate 16 reflects the s-polarized target reflected return beam toward beam combiner 20, which in turn reflects the beam toward detecting surface 25 of detector element 24. As shown in a somewhat exaggerated manner in FIG. 1B, the transmitted and target-return beams have a finite beam width. The target-reflected return beam reflected by combiner 20 is focused by lens 22, here a positive meniscus lens 22, onto substantially a point 23 on detecting surface 25. That is, lens 22 is disposed to place a focal point 23 thereof (i.e. the right focal point thereof as shown in FIG. 1B) on detecting surface 25. Thus, the beam is compressed by lens 22 to a small diameter on detector element surface 25.

Figure 1C:
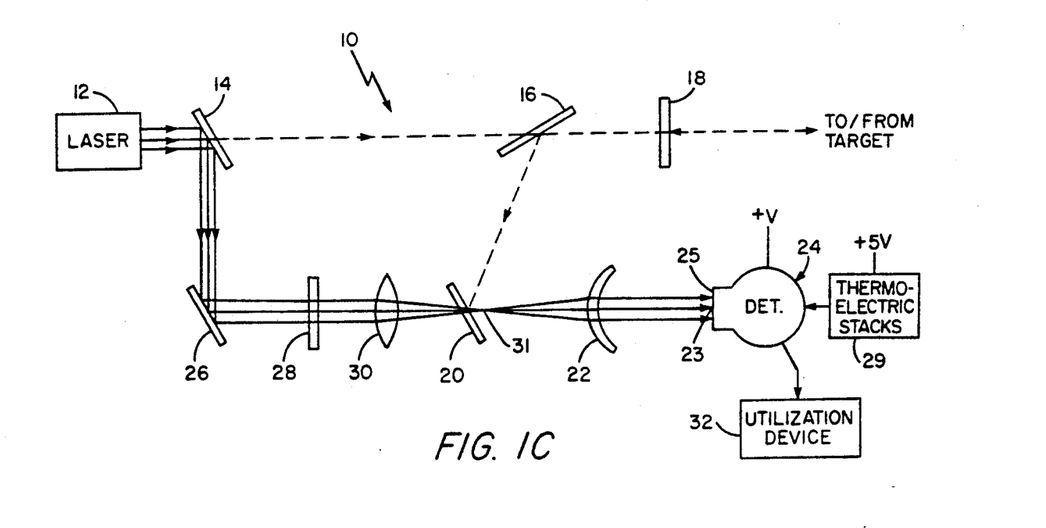
FIG. 1C is a block diagram of the interferometer of FIG. 1A depecting the path of the local oscillator beam thereof.

Referring now to FIG. 1C, the path of the interferometer local oscillator (L.O.) beam is illustrated, and may also be seen to have a finite beam width. In the embodiment of FIGS. 1A-1C, the L.O. beam is derived from the beam produced by laser 12; that is, interferometer 10 is a homodyning system. Thus, a second portion of the p-polarized beam produced by laser 12 is deflected by beam splitter 14 onto mirror 26, which directs such beam through half-waveplate 28 to convert the p-polarized beam to an orthogonally linearly polarized beam, that is, to an s-polarized beam. Such s-polarized L.O. beam is coupled by lens 30, beam combiner 20 and positive meniscus lens 22 onto detecting surface 25 of detector element 24. That is, detector element surface 25 is illuminated by superimposed target-reflected return and local oscillator beams. The superimposed target-reflected return and L.O. beams are of identical linear polarization (i.e., s-polarization) and have the same plane wavefronts. Thus, the superimposed signals interfere on detecting surface 25, with detector element 24 thereby producing a beat frequency signal having a frequency representative of the range of the target. Such beat frequency signal here is coupled to utilization device 32, which may further process the beat frequency signal to determine target Doppler speed, as is known.

Here, detector element 24 is a photoconductive detector, requiring cooling to approximately 190° K (about −83° C.). This is to be compared with a photovoltaic detector, which typically requires cooling to approximately 77° K (about −196° C.), necessitating the use of liquid nitrogen to provide such cooling. However, the cooling requirements of photoconductive detector element 24 may be met by thermoelectric stacks 29, thereby eliminating the need for liquid nitrogen. Here, photoconductive detector 24 is a mercury-cadmiumtelluride (HgCdTe) detector supplied by Lincoln Laboratory of Bedford, Massachusetts, as an integral device cooled to about 190° K by a 5-stage thermoelectric stack 29. Comparable photoconductive detectors are commercially available from New England Research Company of Sudbury, Massachusetts, Honeywell Electro-Optics Center of Lexington, Massachusetts, and Santa Barbara Research Company of Santa Barbara, California. A photoconductive HgCdTe detector is also manufactured by Judson Infared, Inc., 21 Commerce Drive, Montgomeryville, Penna. 18936 as part number J15-TE400 and is integrally cooled to about 200° K by a 4-stage thermoelectric stack. Thermoelectric stacks 29 are also separately commercially available, such as from Marlow Industries of Dallas, Tex.

As is known, photovoltaic detector elements are normally operated in the "shot noise" limited regime, with the shot noise originating from fluctuations in the arrival rate of local oscillator beam photons. Thus, as is known, the lowest noise equivalent power (NEP), and hence maximum sensitivity, for a photovoltaic detector element is achieved by providing a local oscillator beam having a Gaussian intensity distribution on the face of such detector element. Thus, conventionally, the local oscillator beam is focused by a single lens (such as lens 22) to substantially the same point 23 on detecting surface 25 as the target-reflected return beam (see FIG. 1B). However, the primary noise for photoconductive detector element 24 is not photon related, but is due to fluctuations in the "dark current" produced by detector element 24 in the absence of illuminating detecting surface 25 in response to a bias voltage +V (here, approximately 100 millivolts) applied to detector element 24. Thus, it has been found that to minimize the NEP (and hence maximize the sensitivity and signal-to-noise ratio) of photoconductive detector 24, the local oscillator beam should be coupled thereto with a substantially uniform intensity over detecting surface 25 of detector element 24, that is, with an intensity on detecting surface 25 which is substantially uniform thereon rather than focused at a point thereon (such as right focal point 23 of lens 22). Thus, the present invention provides lens 30, here a double convex lens, for focusing the L.O. beam through focal point 31 thereof (i.e. the right focal point 31 thereof as shown in FIG. 1C) onto meniscus lens 22, such meniscus lens 22 responding to such beam by directing the local oscillator beam onto detector element 24 with substantially uniform intensity on detecting surface 25, as shown in FIG. 1C. That is, lenses 30, 22 are disposed with the right focal point of lens 30 substantially aligned with the left focal point of lens 22 at point 31. Thus, the local oscillator beam is focused by lens 30 through focal point 31 and is divergent until such local oscillator beam is incident on meniscus lens 22, with lens 22 refracting the diverging beam into a substantially collimated beam and directing such local oscillator beam onto detector element 24 with substantially uniform intensity over detecting surface 25 thereof. Thus, double convex lens 30 and meniscus lens 22 in combination provide the local oscillator beam with substantially uniform intensity on detecting surface 25, while the target-reflected return beam is maintained focused to substantially a point 23 on detecting surface 25 by meniscus lens 22. The L.O. beam and target-reflected return beam have matching plane wavefronts on detecting surface 25. Thus, photoconductive detector 24 produces a beat frequency signal having a frequency representative of the range of the target, such beat frequency signal here being coupled to utilization device 32.

It has been found that providing a local oscillator beam having substantially uniform intensity distribution on detecting surface 25 of photoconductive detector element 24 produces significantly less of an increase (such as 5 dB less) in detector NEP (and hence a correspondingly significantly lower decrease in signal-to-noise ratio) compared with that obtained when the L.O. beam is focused to substantially a point (i.e., a Gaussian intensity distribution) on photoconductive detector element surface 25. Thus, a liquid nitrogen-cooled photovoltaic detector element may be replaced with a thermoelectrically cooled photoconductive detector element 24 with only a slight, such as 5 dB, increase in detector NEP, thereby providing interferometer 10 with a signal-to-noise ratio within 5 dB of interferometers utilizing photovoltaic detector elements. As discussed, such slight signal-to-noise ratio increase may be compensated by, for example, correspondingly increasing laser power, here by substantially 5 times (to 25 watts) to offset the 5 dB signal-to-noise ratio increase. Thus, a liquid nitrogen-cooled photovoltaic detector element may be replaced with photoconductive detector element 24 without significantly compromising the performance of interferometer 10. Since photoconductive detector 24 is cooled by thermoelectric stacks 29, the requirement for supplying liquid nitrogen coolant for interferometer 10 is eliminated, thereby reducing the size, weight and electrical power consumption of interferometer 10.

Figure 2A:
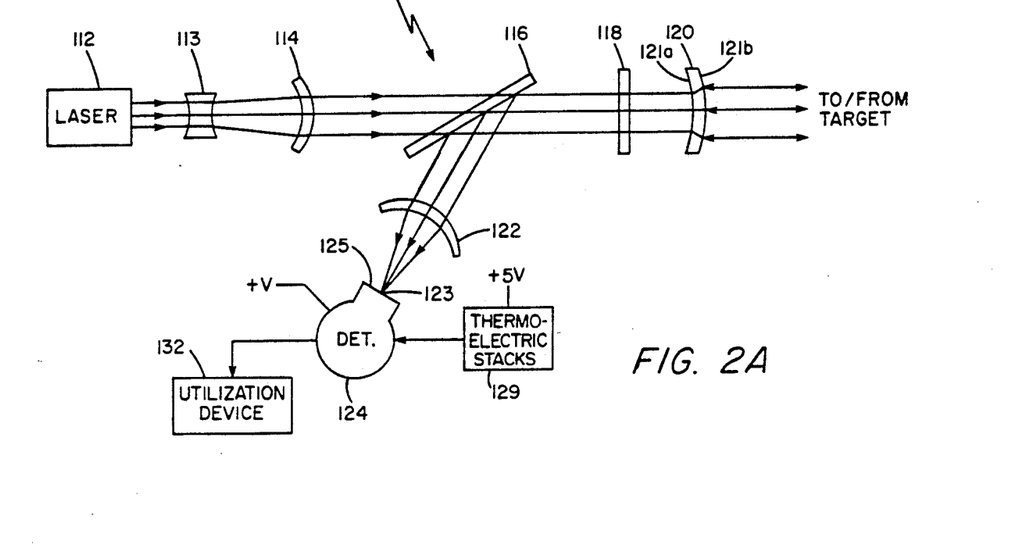
FIG. 2A is a block diagram of a second embodiment of an interferometer according to the present invention, in which the transmitted and target-reflected return beam paths thereof are illustrated.
Figure 2B:
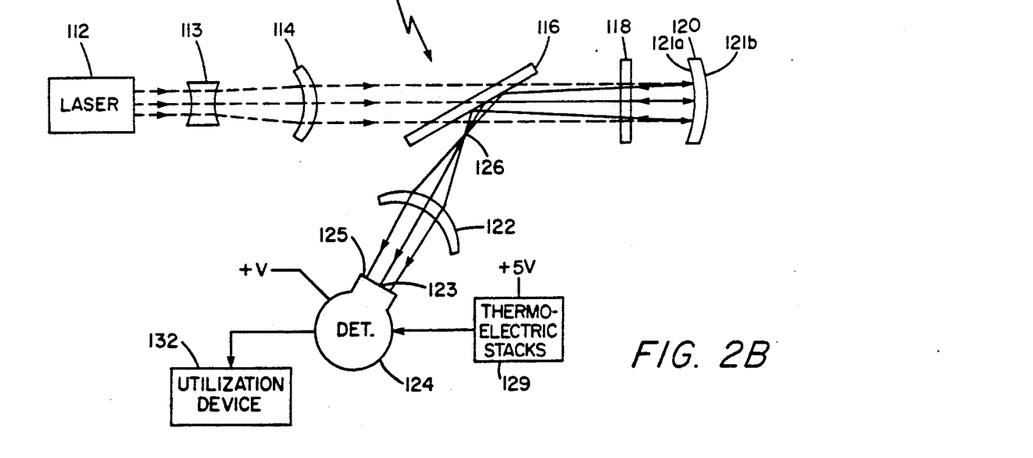
FIG. 2B is a block diagram of the interferometer of FIG. 2A illustrating the local oscillator beam path thereof.

Referring now to FIGS. 2A and 2B, shown is a Fizeau interferometer 100 according to a second embodiment of the present invention. Interferometer 100 receives the output from laser 112, here a $CO_2$ laser, and here comprises beam expander 113, collimating lens 114, Brewster plate 116, quarter waveplate 118, beam splitter 120, lens 122 and detector element 124, arranged as shown. The output of detector element 124 is here coupled to a utilization device 132. FIG. 2A illustrates the paths of the transmit beam and target-reflected return beam of interferometer 100. Thus, here a relatively small-diameter beam produced by laser 112 is expanded by beam expander 113, collimated by lens 114, here a positive meniscus lens, and directed to Brewster plate 116. Laser 112 here produces a p-polarized beam of energy, which is coupled substantially directly through Brewster plate 116. The p-polarization of such beam is converted to, here, right-circular polarization by quarter-waveplate 118, and the beam is transmitted through beam splitter 120 toward a target (not shown). A portion of the transmitted beam reflects from the target and is coupled to quarter-waveplate 118 as a left-circularly polarized beam via beam splitter 120. Quarter-waveplate 118 converts the left-circularly polarized target-reflected return beam to an s-polarized beam, which is deflected by Brewster plate 116 to lens 122. Lens 122, here a positive mensicus lens, focuses the target-reflected return beam onto a substantially a point 123 on detecting surface 125 of detector element 124. That is, detecting surface 125 is disposed at a focal point 123 of lens 122 (the left focal point of lens 122 as shown in FIG. 2A). Here, detector element 124 is a photoconductive detector cooled by thermoelectric stacks 129.

Referring now to FIG. 2B, shown are the rays for the local oscillator (L.O.) beam generated by beam splitter 120. As discussed above, a right-circularly polarized beam is incident thereon from laser 112 via expander 113, lens 114, Brewster plate 116 and quarter-waveplate 118. Here, a first surface 121a of beam splitter 120 reflects a predetermined portion of such beam back toward Brewster plate 116 as a left-circularly polarized beam, such polarization being converted to s-polarization by quarter-waveplate 118. Here, the first surface 121a and a second surface 121b of beam splitter 120 are curved (unlike the substantially flat surfaces of such beam splitter in a conventional Fizeau interferometer). Such curved surfaces (here, primarily first surface 121a) reflect the local oscillator beam onto Brewster plate 116 not as a substantially collimated beam, but as a convergent beam which is reflected by Brewster plate 116 through a focal point 126 and onto lens 122 as a diverging beam. Lens 122 and beam splitter 120 are arranged to dispose the focal point 126 of beam splitter 120 at a focal point (i.e. the right focal point as shown in FIG. 2B) of lens 122. Thus, the local oscillator beam is substantially collimated by lens 122 and directed onto detector element 124 with substantially uniform illumination over detecting surface 125 thereof. Thus, as shown in FIG. 2A and FIG. 2B, while the target-reflected return beam is focused at substantially a point 123 on such detecting surface 125, the local oscillator beam is coupled to detector element 124 with substantially uniform intensity on such detecting surface 125. Thus, detector element 124 "sees" a relatively large diameter plane wave local oscillator signal compared with the diameter of the plane wave target-reflected return signal.

It is again noted that since detecting surface 125 of photoconductive detector element 124 is substantially uniformly illuminated by the local oscillator beam, the noise equivalent power (NEP) of such detector element 124 is substantially reduced from that which would be provided if the local oscillator beam were focused to substantially the same point 123 on detecting surface 125 as the target-reflected return beam (i.e., as would occur if surfaces 121a, 121b of beam splitter 120 were made substantially flat rather than curved as shown in FIGS. 2A and 2B). It is noted that as a result of the curvature of surfaces 121a, 121b, beam splitter 120 slightly expands the diameter of the transmitted beam coupled therethrough and correspondingly reduces the diameter of the target-reflected return beam coupled therethrough, as shown in FIG. 2A.

Figure 3A:
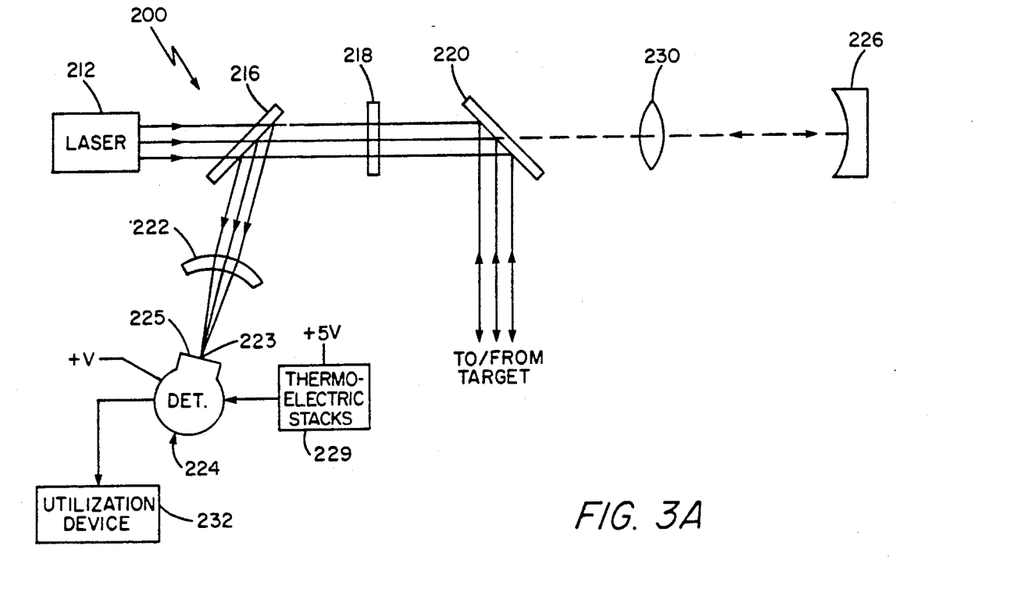
FIG. 3A is a block diagram of a third embodiment of an interferometer according to the present invention depicting the paths of the transmitted and target-reflected return beams thereof.
Figure 3B:
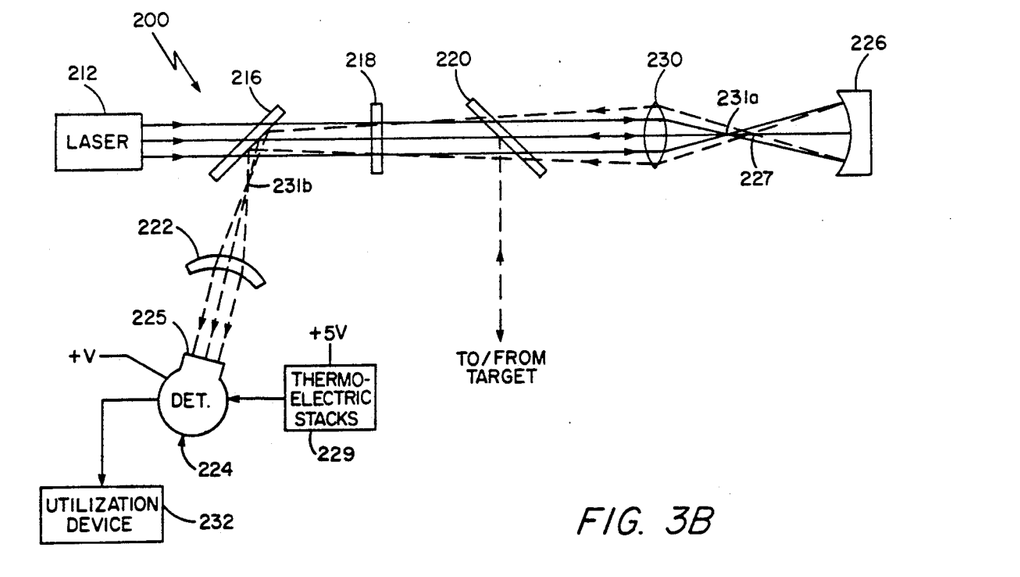
FIG. 3B is a block diagram of the interferometer of FIG. 3A illustrating the path of the local oscillator beam thereof.

Referring now to FIGS. 3A and 3B, shown is a third embodiment of the present invention implemented in a Michelson interferometer 200. Interferometer 200 is fed by the output of laser 212 and comprises Brewster plate 216, quarter-waveplate 218, high-reflectivity beam splitter 220, lens 222 and detector element 224, arranged as shown. Interferometer 200 also comprises concave mirror 226 and lens 230, as shown. FIG. 3A illustrates rays of the transmitted and target-reflected return beams. Thus, a beam of electromagnetic energy, here p-polarized, produced by laser 212 is coupled through Brewster plate 216, converted to a circularly (here, right-circularly) polarized beam by quarter-waveplate 218 and is incident on high-reflectivity beam splitter 220. Such high-reflectivity beam splitter 220 reflects a substantial portion of the incident beam, such portion of the beam being transmitted for reflection of a target (not shown). A portion of the beam reflected by the target is incident on high-reflectivity beam splitter 220 and reflected to quarter-waveplate 218 as a left-circularly polarized beam, the polarization of which is converted to s-polarization by quarter-waveplate 218. Such s-polarized target-reflected return beam thus is deflected by Brewster plate 216 and focused by lens 222 (here, a positive meniscus lens) onto substantially a point 223 on detecting surface 225 of detector element 224, here a photoconductive detector element cooled by thermoelectric stacks 229. That is, lens 222 and detector 224 are disposed to place a focal point 223 of lens 222 (the left focal point thereof as shown in FIG. 3A) on detecting surface 225.

Referring now to FIG. 3B, which illustrates rays for the local oscillator beam of interferometer 200, a small portion of the right-circularly polarized beam incident on beam splitter 220 from laser 212 is coupled therethrough to lens 230, here a double-convex lens. Lens 230 focuses such beam through a first focal point 231a thereof and onto concave mirror 226 as a divergent beam, as shown. The concave surface of mirror 226 reflects the beam incident thereon back toward lens 230, and focuses such reflected beam through focal point 227 and to lens 230 as a divergent beam, such reflected beam being coupled through lens 230, beam splitter 220, and quarter-waveplate 218 (which converts the polarization of the beam to s-polarization) to Brewster plate 216. Such s-polarized beam is deflected by Brewster plate 216 toward lens 222. Lens 230 focuses the beam incident thereon from concave mirror 226 through focal point 231b, as shown in FIG. 3B. Here, lens 230, concave mirror 226, Brewster plate 216, and lens 222 are arranged to place such focal point 231b at a focal point of lens 222 (i.e. the right focal point of lens 222 as shown in FIG. 3B). Thus, the L.O. beam, incident on lens 222 as a diverging beam, is substantially collimated by lens 222 and directed onto detecting surface 225 of photoconductive detector element 224 with substantially uniform intensity distribution on such detecting surface 225. Detector element 224 produces a beat frequency signal in response to the target-reflected and L.O. beams incident thereon and couples such beat frequency signal to utilization device 232.

Thus, as previously discussed, the noise equivalent power (NEP) of photoconductive detector element 224 is substantially improved from that which would occur if the L.O. beam were focused to substantially a point (such as point 223) on detecting surface 225 along with the target-reflected return beam.

Figure 3C:
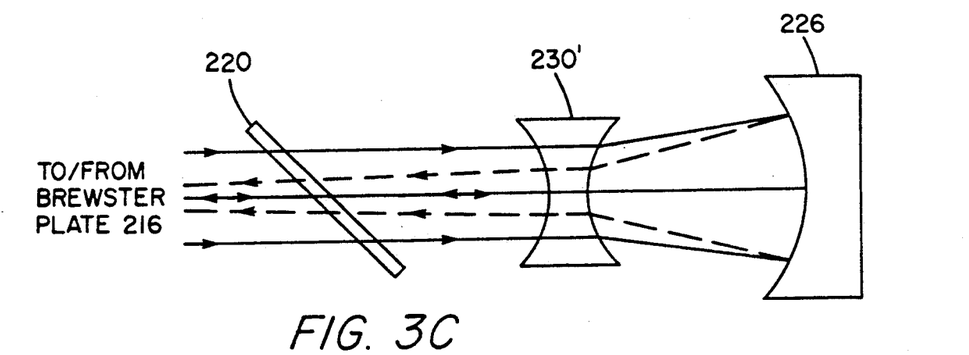
FIGS. 3C-3E illustrate alternate implementations of certain optical elements of the interferometer of FIGS. 3A and 3B.
Figure 3D:
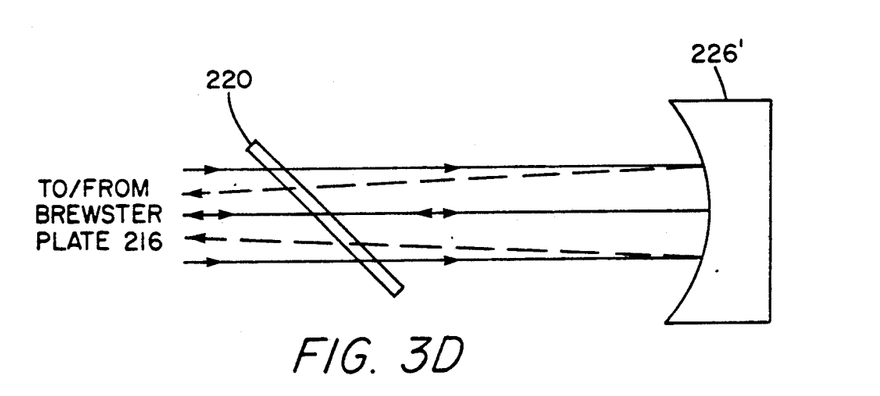
Figure 3E:
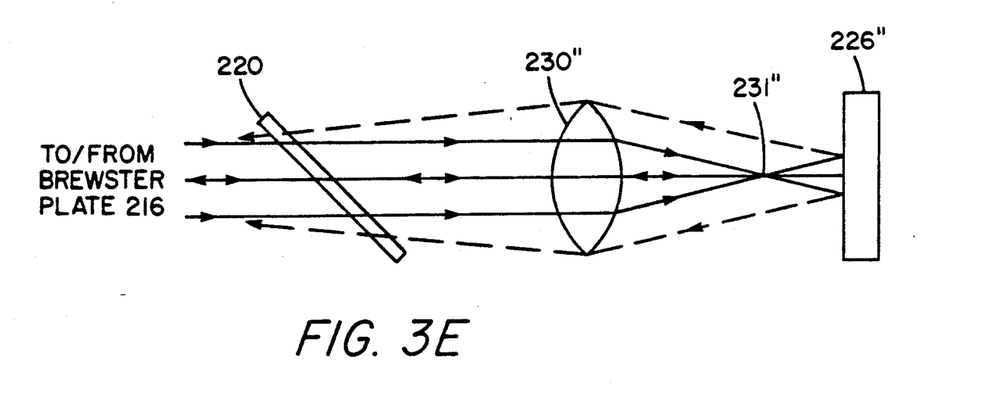

It is noted that with the arrangement of lens 230 and concave mirror 226 in FIGS. 3A and 3B, the L.O. beam incident on lens 230 from concave mirror 226 has a greater diameter than the beam incident on such lens 230 from laser 212. This provides for a relatively wide range of adjustment of system parameters, such as the "cone angle" of detector element 224. Various alternative arrangements for focusing the L.O. beam are shown in FIGS. 3C-3E. In FIG. 3C, the double convex lens 230 of FIGS. 3A, 3B has been replaced by a double concave lens 230', which expands the beam incident thereon from laser 212 and Brewster plate 216. Concave mirror 226 reflects the expanding beam back toward lens 230' as a sharply converging beam, the angle of convergence of such beam being reduced by lens 230', which couples the L.O. beam back to Brewster plate 216. The arrangement of FIG. 3D utilizes only a concave mirror 226' to reflect the beam from laser 212 back toward Brewster plate 216 as a convergent beam. It is noted that in the arrangements of FIGS. 3C, 3D, the diameter of the L.O. beams coupled to Brewster plate 216 is less than that of the beams coupled to beam splitter 220 from laser 212. In the arrangement of FIG. 3E, a double convex lens 230" is utilized in combination with a flat mirror 226". The beam from laser 212 and Brewster plate 216 is focused by lens 230" through a focal point 231" thereof and onto flat mirror 226" as a divergent beam. Mirror 226" reflects such beam back toward lens 230" as a diverging beam, the reflected beam having a slightly larger diameter at lens 230" than that of the beam from laser 212. Lens 230" focuses such reflected beam back to Brewster plate 216 as a converging beam. It is noted that in the arrangements of FIGS. 3C-3E, the various alternative optical elements (i.e. double concave lens 230', concave mirror 226; concave mirror 226'; double convex lens 230", flat mirror 226", respectively) are disposed in relation to positive meniscus lens 222 (FIGS. 3A, 3B) to allow lens 222 to couple a substantially collimated L.O. beam to detector element 224, thereby providing substantially uniform intensity distribution over detecting surface 225 thereof.

Figure 4A:
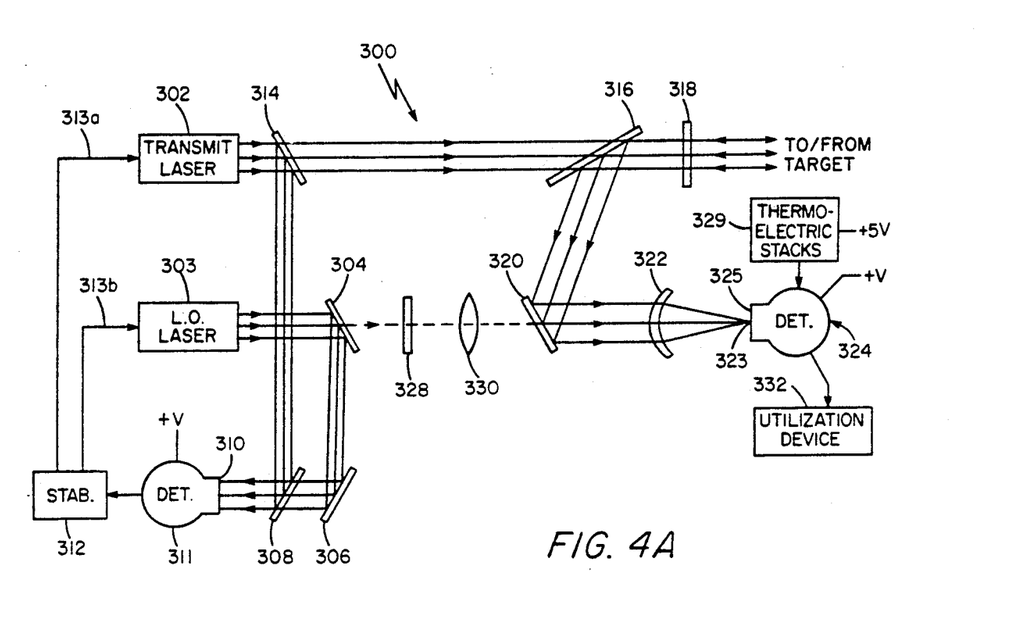
FIG. 4A is a block diagram of a fourth embodiment of the interferometer of the present invention depicting the paths of the transmitted beam and the target-reflected return beam thereof.
Figure 4B:
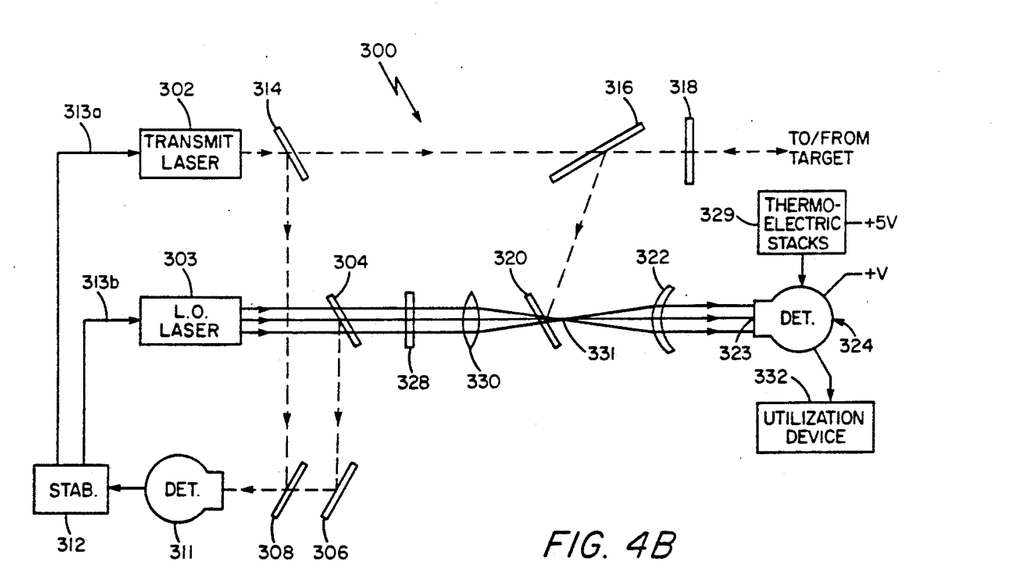
FIG. 4B is a block diagram of the interferometer of FIG. 4A illustrating the path of the local oscillator beam thereof.

Referring now to FIGS. 4A and 4B, a heterodyne interferometer 300 according to the present invention is shown as being fed by a transmit laser 302 and a local oscillator (L.O.) laser 303. As shown in FIG. 3A, interferometer 300 comprises beam splitter 314 for directing a first portion of a suitably polarized, such as p-polarized, beam from transmit laser 302 through Brewster plate 316 and quarter-waveplate 318 toward a target (not shown). Quarter-waveplate 318 converts the polarization of the beam transmitted toward the target to circular (here, right-circular) polarization. A portion of the target-reflected return beam is received by interferometer 300 as a left-circularly polarized beam, which is converted to s-polarization by quarter-waveplate 318 and thus deflected by Brewster plate 316 onto combiner 320. The target-reflected return beam from combiner 320 is focused by meniscus lens 322 to substantially a point 323 on a detecting surface 325 of photoconductive detector element 324 cooled by thermoelectric stacks 329. The output of detector 324 is coupled to utilization device 332, as shown.

Local oscillator laser 303 produces a beam which is typically offset in frequency from that of transmit laser 302 to provide heterodyning between the target-reflected return and L.O. beams. The output of L.O. laser 303, here also p-polarized, is coupled to beam splitter 304, a first portion of such beam being coupled to detector 324 in a manner to be described. A second portion of the beam produced by L.O. laser 303 is reflected by beam splitter 304 onto mirror 306, which directs the second portion of the local oscillator beam to combiner 308, as shown. A second portion of the transmit laser beam is directed by beam splitter 314 onto such combiner 308. Combiner 308 directs the second portions of the local oscillator beam and transmit beam onto the detecting surface 310 of stabilization detector 311 with substantially uniform illumination. Stabilization detector 311 provides a beat frequency signal to a conventional stabilization device 312, which applies control signals on lines 313a, 313b to transmit laser 302 and local oscillator laser 303, respectively, to maintain the output frequencies thereof substantially constant, as is known. Since substantially uniform illumination is applied to detecting surface 310, stabilization detector 311 may be implemented as a thermoelectrically cooled photoconductive detector, as has been discussed. However, since the power level of the beams coupled to stabilization detector 311 is typically relatively high (especially compared with the power level of the target-reflected return beam coupled to detector 324), stabilization detector 311 may be implemented with a relatively inexpensive (and low sensitivity) detector element, such as a pyroelectric detector. Alternately, beam splitters 304, 314, mirror 306, combiner 308, and stabilization detector 311 may be eliminated and stabilization device 312 driven by the output of detector 324, since a small portion of the transmitted beam produced by laser 302 is coupled to detector 324 via quarter-waveplate 318 and Brewster plate 316.

Referring now to FIG. 4B, the path of the local oscillator beam coupled to detector 324 is shown. The first portion of the p-polarized local oscillator beam produced by L.O. laser 303 coupled through beam splitter 304 is converted to s-polarization by half-waveplate 328. Lens 330, here a double convex lens having a focal length defined by the distance between such lens 330 and right focal point 331, focuses the L.O. beam through right focal point 331 thereof and onto meniscus lens 322 as a divergent beam. Lenses 322, 330 here are arranged to dispose such right focal point 331 of lens 330 at the left focal point of meniscus lens 322. Thus, meniscus lens 322 collimates the divergent local oscillator beam incident thereon from lens 330 and directs such local oscillator beam onto detector element 324 with substantially uniform intensity distribution over detecting surface 325 thereof. Thus, as discussed, while the target-reflected return beam is focused to substantially a point 323 on detecting surface 325 (FIG. 4A), the local oscillator beam illuminates detecting surface 325 with substantially uniform intensity. Thus, as discussed, photoconductive detector element 324 is provided with a noise equivalent power (NEP) improved over that which would be provided thereby if the local oscillator beam were to be focused at a point (such as point 323) on surface 325.

Having described preferred embodiments of the present invention, modifications thereto may become apparent to those skilled in the art. For example, while interferometers 10, 100, 200, 300 have been discussed as generating p-polarized transmit beams and utilizing s-polarized local oscillator beams, such interferometers 10, 100, 200, 300 may, of course, be implemented using s-polarized transmit beams and p-polarized local oscillator beams. Further, mirror 26 in the embodiment of FIG. 1C may be made slightly concave to produce convergence of the L.O. beam directed towards lens 22 through focal point 31, thereby allowing lens 30 to be omitted. Thus, it is understood that the present invention is to be limited only by the scope of the appended claims.

What is claimed is:

1. In combination:
   means for transmitting a beam of electromagnetic energy toward a target;
   a photoconductive detector element having a surface, wherein a primary source of noise in said detector element is due to fluctuations in current produced by said detector element in the absence of illumination of said surface;
   means for directing portions of the transmitted beam reflected by the target onto said detector element surface; and
   means for providing a local oscillator beam of electromagnetic energy, said local oscillator beam providing means and said directing means comprising means for coupling the local oscillator beam to said detector element with a substantially uniform intensity distribution on the surface thereof.

2. The combination of claim 1 wherein the directing means comprises means for focusing the target-reflected portions of the transmitted beam to substantially a point on the surface of the detector element.

3. The combination of claim 2 wherein the target-reflected beam focusing means comprises a first lens, the first lens and detector element being disposed to position a first focal point of the first lens substantially on the surface of the detector element.

4. The combination of claim 3 wherein the coupling means comprises means for focusing the local oscillator beam through a second focal point of the first lens and onto the first lens.

5. The combination of claim 4 wherein the local oscillator beam focusing means comprises a second lens having a focal point substantially aligned with the second focal point of the first lens.

6. In combination:
   means for transmitting a first portion of a beam of electromagnetic energy toward a target;
   means for producing a local oscillator beam of electromagnetic energy from a second portion of said beam of electromagnetic energy;
   a photoconductive detector element having a surface, wherein a primary source of noise in said detector element is due to fluctuations in current produced by said detector element in the absence of illumination of said surface;
   means for directing portions of the transmitted beam reflected by the target to the detector element, said directing means comprising means for focusing said target-reflected beam portions to substantially a point on the surface of the detector element; and
   means, comprising said focusing means, for coupling the local oscillator beam to the detector element with a substantially uniform intensity distribution on the surface of the detector element.

7. The combination of claim 6 wherein the target-reflected beam portions focusing means comprises a first lens having a first focal point substantially aligned with the surface of the detector element.

8. The combination of claim 7 wherein the coupling means comprises means for focusing the local oscillator beam through a second focal point of the first lens and onto the first lens.

9. The combination of claim 8 wherein the local oscillator beam focusing means comprises a second lens having a focal point substantially aligned with the second focal point of the first lens.

10. In combination:
    means for transmitting a first portion of a beam of electromagnetic energy toward a target;
    a photoconductive detector element having a detecting surface, wherein a primary source of noise in said detector element is due to fluctuations in current produced by said detector element in the absence of illumination of said detecting surface;
    means for reflecting a second portion of the beam of electromagnetic energy toward the detecting surface of the detector element;
    means for focusing portions of the transmitted beam reflected by the target to substantially a point on the detecting surface; and
    means, comprising the second beam portion reflecting means and the focusing means, for coupling the second portion of the beam to the detector element substantially uniformly on the detecting surface thereof.

11. The combination of claim 10 wherein the focusing means comprises a first lens, the first lens and the detector element being disposed to position a first focal point of the first lens substantially on the detecting surface.

12. The combination of claim 11 wherein the second beam portion reflecting means comprises means for focusing the second portion of the beam through a second focal point of the first lens and onto the first lens.

13. The combination of claim 12 wherein the second beam portion focusing means comprises a reflecting surface of the second beam portion reflecting means.

14. In combination:
    means for producing a first beam of electromagnetic energy and transmitting the first beam toward a target;
    a photoconductive detector element having a detecting surface, wherein a primary source of noise in said detector element is due to fluctuations in current produced by said detector element in the absence of illumination of said detecting surface;
    means for directing portions of the first beam reflected by the target onto the detecting surface of the detector element;
    means for producing a second beam of electromagnetic energy; and
    means, including the directing means, for coupling the second beam to the detector element with a substantially uniform intensity distribution on the detecting surface thereof.

15. The combination of claim 14 wherein the directing means comprises means for focusing the target reflected portions of the first beam to substantially a point on the detecting surface of the detector element.

16. The combination of claim 15 wherein the target-reflected beam focusing means comprises a firs lens, the first lens and detector element being disposed to position a first focal point of the first lens substantially on the detecting surface of the detector element.

17. The combination of claim 16 wherein the coupling means comprises means for focusing the second beam through a second focal point of the first lens and onto the first lens.

18. The combination of claim 17 wherein the second beam focusing means comprises a second lens having a focal point substantially aligned with the second focal point of the first lens.

19. The combination of claim 14 further comprising means, responsive to a control signal from the detector element, for stabilizing the first beam producing means and the second beam producing means.

20. In combination:
   means for producing a beam of electromagnetic energy;
   means for transmitting a first portion of the beam for reflection by a target;
   means for producing a local oscillator beam from a second portion of the produced beam of electromagnetic energy;
   a photoconductive detector element comprising a detecting surface, wherein a primary source of noise in said detector element is due to fluctuations in current produced by said detector element in the absence of illumination of said detecting surface;
   means for focusing portions of the transmitted beam reflected by the target onto substantially a point on the detecting surface; and
   means, including the target-reflected beam portions focusing means, for coupling the local oscillator beam onto a relatively large portion of the detecting surface with substantially uniform intensity over said relatively large portion of the detecting surface.

21. The combination of claim 20 wherein the target-reflected beam portions focusing means comprises a first lens, the first lens and the detector element being disposed to position a first focal point of the first lens substantially on the detecting surface.

22. The combination of claim 21 wherein the coupling means comprises means for focusing the local oscillator beam through a second focal point of the first lens and onto the first lens.

23. The combination of claim 22 wherein the local oscillator beam focusing means comprises a second lens and a reflecting surface, responsive to the local oscillator beam, for focusing the local oscillator beam through the second focal point.

24. The combination of claim 23 wherein the second lens comprises a double convex lens and the reflecting surface comprises a concave surface.

25. The combination of claim 23 wherein the second lens comprises a double concave lens and the reflecting surface comprises a concave surface.

26. The combination of claim 23 wherein the second lens comprises a double convex lens and the reflecting surface comprises a substantially flat surface.

27. The combination of claim 22 wherein the local oscillator beam focusing means comprises a concave reflecting surface.

28. A laser radar system comprising:
   means for transmitting a first portion of a beam of electromagnetic energy toward a target and for producing a local oscillator beam from a second portion of the beam of electromagnetic energy;
   a photoconductive detector element having a detecting surface, wherein a primary source of noise in said detector element is due to fluctuations in current produced by said detector element in the absence of illumination of said detecting surface;
   a first focusing element having a first focal point disposed substantially on the detecting surface, portions of the transmitted beam reflected by the target being incident on the first focusing element; and
   a second focusing element, the local oscillator beam being incident thereon, the first and second focusing elements being disposed to substantially align a focal point of the second focusing element with a second focal point of the first focusing element.

29. The interferometer of claim 28 wherein the first focusing element comprises a first lens.

30. The interferometer of claim 29 wherein the second focusing element comprises a second lens.

31. The interferometer of claim 29 wherein the second focusing element comprises a reflecting surface.

* * * * *